United States Patent
Houck et al.

(10) Patent No.: US 11,150,390 B2
(45) Date of Patent: Oct. 19, 2021

(54) MULTISPECTRAL SENSOR RESPONSE BALANCING

(71) Applicant: VIAVI Solutions Inc., San Jose, CA (US)

(72) Inventors: William D. Houck, Santa Rosa, CA (US); Steven Saxe, Santa Rosa, CA (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 15/929,748

(22) Filed: May 20, 2020

(65) Prior Publication Data

US 2020/0284958 A1  Sep. 10, 2020

Related U.S. Application Data

(62) Division of application No. 16/129,332, filed on Sep. 12, 2018, now Pat. No. 10,677,972.

(60) Provisional application No. 62/596,600, filed on Dec. 8, 2017.

(51) Int. Cl.
  *G02B 5/26* (2006.01)
  *G01J 3/28* (2006.01)
  *G01J 3/26* (2006.01)
  *G02B 5/08* (2006.01)

(52) U.S. Cl.
  CPC .......... *G02B 5/26* (2013.01); *G01J 3/26* (2013.01); *G01J 3/2803* (2013.01); *G02B 5/08* (2013.01); *G01J 2003/2806* (2013.01); *G01J 2003/2813* (2013.01)

(58) Field of Classification Search
  CPC .... G02B 5/26; G01J 3/2803; G01J 2003/2806
  See application file for complete search history.

(56) References Cited

U.S. PATENT DOCUMENTS

5,406,067 A *  4/1995  Keller ............... G01J 3/2803
                                                  250/208.1
6,529,328 B1   3/2003  Cheng et al.
8,749,903 B2   6/2014  Yamada et al.
                 (Continued)

FOREIGN PATENT DOCUMENTS

CN    1561112 A    1/2005
CN    1913165 A    2/2007
                 (Continued)

OTHER PUBLICATIONS

Extended European Search Report for Application No. EP18211101.3, dated Apr. 10, 2019, 8 pages.

*Primary Examiner* — Maurice C Smith
(74) *Attorney, Agent, or Firm* — Harrity & Harrity, LLP

(57) ABSTRACT

An optical filter may include a substrate. The optical filter may include a first mirror. The optical filter may include a second mirror. The optical filter may include a spacer. The first mirror, the second mirror, and the spacer may form a plurality of component filters. A first component filter, of the plurality of component filters, may be associated with a first cross-sectional area and a second component filter, of the plurality of component filters, is associated with a second cross-sectional area. The first cross-sectional area and the second cross-sectional area may be configured to response balance the first component filter and the second component filter.

20 Claims, 7 Drawing Sheets

(56) References Cited

U.S. PATENT DOCUMENTS

| | | |
|---|---|---|
| 8,854,515 B2 * | 10/2014 | Lin .................. H01L 27/14645 |
| | | 348/294 |
| 8,941,834 B2 | 1/2015 | Meijer et al. |
| 2010/0321694 A1 | 12/2010 | Clark et al. |
| 2011/0049340 A1 | 3/2011 | Tisserand et al. |
| 2015/0090866 A1 * | 4/2015 | Lee .................... H01L 27/1443 |
| | | 250/226 |
| 2017/0186794 A1 | 6/2017 | Ockenfuss |
| 2019/0179067 A1 | 6/2019 | Houck et al. |

FOREIGN PATENT DOCUMENTS

| | | |
|---|---|---|
| CN | 1982953 A | 6/2007 |
| CN | 101730857 A | 6/2010 |
| CN | 101965505 A | 2/2011 |
| CN | 102385211 A | 3/2012 |
| CN | 103928483 A | 7/2014 |
| EP | 3187910 A1 | 7/2017 |
| JP | H0814509 B2 | 2/1996 |
| TW | 200936995 A | 9/2009 |
| TW | 201734416 A | 10/2017 |
| WO | 2009102328 A1 | 8/2009 |

* cited by examiner

MULTISPECTRAL SENSOR RESPONSE BALANCING

RELATED APPLICATION(S)

This application is a divisional of U.S. patent application Ser. No. 16/129,332, filed Sep. 12, 2018, which claims priority under 35 U.S.C. § 119 to U.S. Provisional Patent Application No. 62/596,600, filed on Dec. 8, 2017, the contents of which are incorporated by reference herein in their entirety.

BACKGROUND

An optical transmitter may emit light that is directed toward an object. For example, in a gesture recognition system, the optical transmitter may transmit near infrared light toward a user, and the near-infrared light may be reflected off the user toward an optical receiver. In this case, the optical receiver may capture information regarding the near-infrared light, and the information may be used to identify a gesture being performed by the user. For example, a device may use the information to generate a three dimensional representation of the user, and to identify the gesture being performed by the user based on the three dimensional representation.

In another example, information regarding the near-infrared light may be used to recognize an identity of the user, a characteristic of the user (e.g., a height, a weight, a pulse, a blood oxygenation, etc.), a characteristic of another type of target (e.g., a distance to an object, a size of the object, a shape of the object, a spectroscopic signature of the object, etc.), and/or the like. However, during transmission of the near-infrared light toward the user or object and/or during reflection from the user or object toward the optical receiver, ambient light may interfere with the near-infrared light. Thus, the optical receiver may be optically coupled to an optical filter, such as a bandpass filter, to filter ambient light and to allow near-infrared light to pass through toward the optical receiver. Additionally, or alternatively, when performing sensing of multiple wavelengths of light, a filter may be provided to ensure that each wavelength of light, of the multiple wavelengths of light, is directed to a different sensor.

A multispectral sensor device, which may be an optical receiver, may be utilized to capture information about the multiple wavelengths of light. The multispectral sensor device may include a set of sensor elements (e.g., optical sensors, spectral sensors, and/or image sensors) that capture the information and are coupled to a multispectral filter. For example, an array of sensor elements may be utilized to capture information relating to multiple frequencies, and the multispectral filter may direct, to each sensor element, light associated with a different frequency. In some cases, a single filter may be disposed to cover each sensor element of the sensor element array, and may form a set of channels for the sensor element array.

SUMMARY

According to some possible implementations, an optical filter may include a substrate. The optical filter may include a first mirror. The optical filter may include a second mirror. The optical filter may include a spacer. The first mirror, the second mirror, and the spacer may form a plurality of component filters. A first component filter, of the plurality of component filters, may be associated with a first cross-sectional area and a second component filter, of the plurality of component filters, is associated with a second cross-sectional area. The first cross-sectional area and the second cross-sectional area may be configured to response balance the first component filter and the second component filter.

According to some possible implementations, a binary multispectral filter may include a plurality of layers. The plurality of layers may include a set of high refractive index layers associated with a first refractive index and a set of low refractive index layers associated with a second refractive index that is less than the first refractive index. The plurality of layers may form a plurality of channels to direct a plurality of wavelengths of light. A plurality of cross-sectional areas of a plurality of component filters may correspond to the plurality of channels is varied to configure a response associated with the plurality of channels to a particular response.

According to some possible implementations, a system may include a set of optical sensors disposed in a substrate. The system may include a multispectral filter deposited on the substrate. The multispectral filter may include at least one layer configured to form a plurality of channels corresponding to the set of optical sensors. A plurality of cross-sectional areas of the plurality of channels may be configured to response balance the set of optical sensors.

DETAILED DESCRIPTION

Figure 1:
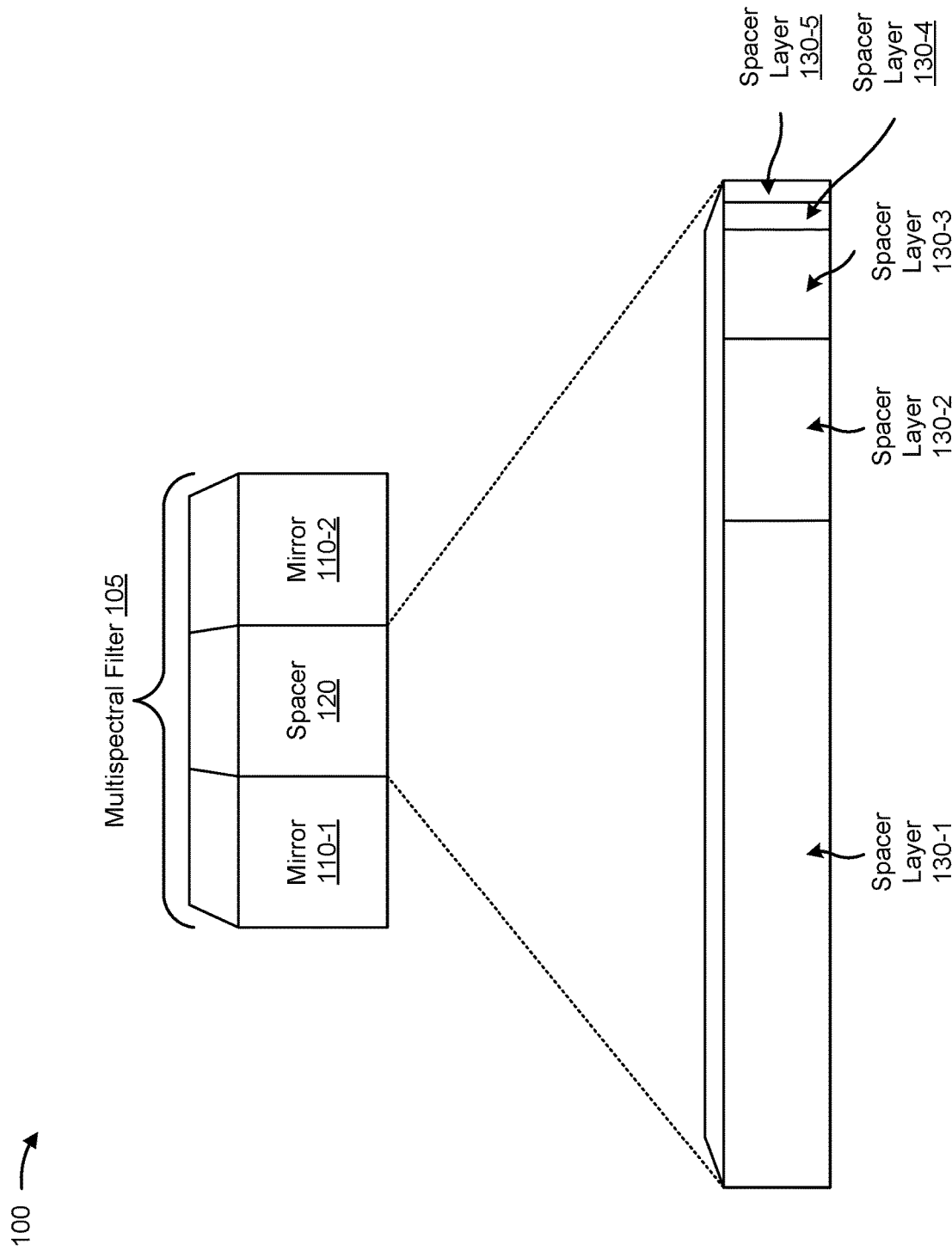
FIG. 1 is a diagram of an example implementation of a multispectral filter described herein.

The following detailed description of example implementations refers to the accompanying drawings. The same reference numbers in different drawings may identify the same or similar elements.

A sensor element (e.g., an optical sensor) may be incorporated into an optical sensor device to obtain information (e.g., spectral data) regarding a set of electromagnetic frequencies. For example, the optical sensor device may include an image sensor, a multispectral sensor, and/or the like that may perform a sensor measurement of light. The optical sensor device may utilize one or more sensor technologies, such as a complementary metal-oxide-semiconductor (CMOS) technology, a charge-coupled device (CCD) technology, and/or the like. The optical sensor device may include multiple sensor elements (e.g., an array of sensor elements) each configured to obtain information about a different frequency of light.

A sensor element may be associated with a filter that filters light to the sensor element. For example, the sensor element may be aligned with a linear variable filter (LVF), a circular variable filter (CVF), a Fabry-Perot filter, and/or the like to cause a portion of light directed toward the sensor element to be filtered. For a binary filter structure, such as a Fabry-Perot filter, a spacer may be positioned between reflectors (e.g., mirrors) of the binary filter structure. Configuration of refractive indices, thicknesses, and/or the like of layers of the reflectors, layers of the spacer, and/or the like may enable configuration of the binary filter structure to form a set of channels. A channel may include a portion of the filter that directs light to a sensor element of a sensor element array. In this way, the sensor element array may obtain information regarding multiple different wavelengths of light.

However, a sensor element may be associated with a first sensor responsivity to a first wavelength of light and a second sensor responsivity to a second wavelength of light. Similarly, the filter may be associated with a first filter responsivity for passing through the first wavelength of light and a second filter responsivity for passing through a second wavelength of light. Further, in some cases, a light source may provide different levels of flux at different wavelengths of light. As a result, an optical power of the first wavelength of light may exceed a maximum optical power threshold associated with a first sensor element, which may result in insufficient signal to noise ratio for the first sensor element to perform an accurate measurement of the first wavelength of light. In contrast, an optical power of the second wavelength of light may be less than a minimum optical power threshold associated with a second sensor element, which may result in insufficient signal to noise ratio for the second sensor element to perform an accurate measurement of the second wavelength of light. Moreover, a saturated sensor element (e.g., a sensor element receiving radiant energy greater than a threshold) may distribute charge to adjacent sensor elements, which may reduce an accuracy of measurements as a result of false signal effects, crosstalk effects, and blooming effects.

In some cases, a gain flattening filter may be disposed into an optical path to avoid a mismatch between optical powers of the first wavelength of light and the second wavelength of light by attenuating light passing through the gain flattening filter. In this way, the gain flattening filter may prevent the first wavelength of light from exceeding the maximum optical power threshold, but may further reduce an optical power of the second wavelength of light. To compensate for the reduced optical power of the second wavelength of light, an exposure time of the sensor element array may be increased to increase an amount of light of the second wavelength that is measured by the second sensor element. However, increasing an exposure time may result in excessive time to perform a measurement, inaccuracy relating to capture of stray light, and/or the like.

Some implementations, described herein, provide a multispectral filter array with integrated response balancing. In this case, the multispectral filter array may be configured with different sized channels (e.g., a first channel for the first wavelength of light with a first cross-sectional area and a second channel for the second wavelength of light with a second cross-sectional area) to balance an optical power of wavelengths of light directed to sensor elements of a sensor element array. In this way, a multispectral filter array may be provided for a sensor element array that improves signal to noise ratio of measurements of the sensor element array, improves accuracy of the sensor element array, reduces exposure time of the sensor element array, and/or the like. Moreover, the multispectral filter may reduce a likelihood of false signal effects, crosstalk effects, and blooming effects by reducing a likelihood of sensor element saturation, sensor element distribution of charge to adjacent sensor elements, and/or the like.

FIG. 1 is a diagram of an example implementation 100 described herein. As shown in FIG. 1, a multispectral filter 105 (e.g., a binary structure optical filter array) may include a first mirror 110-1, a second mirror 110-2, and a spacer 120.

As further shown in FIG. 1, first mirror 110-1 and second mirror 110-2 may sandwich spacer 120. In other words, spacer 120 may separate first mirror 110-1 and second mirror 110-2 by a threshold distance, and/or faces of spacer 120 may be enclosed by first mirror 110-1 and second mirror 110-2. In some implementations, mirrors 110 may be associated with a particular material. For example, mirrors 110 may include a set of metal mirror layers (e.g., silver), a set of dielectric mirror layers (e.g., alternating hydrogenated silicon layers and silicon dioxide layers), and/or the like to direct a portion of light directed from a light source toward sensor elements associated with multispectral filter 105. Mirrors 110 may align with each sensor element of a sensor element array associated with each channel of multispectral filter 105.

In some implementations, spacer 120 may include one or more spacer layers 130. For example, spacer 120 may include a set of spacer layers 130-1 through 130-5 (e.g., dielectric layers). In some implementations, a thickness of one or more spacer layers 130 may be associated with ensuring a minimum spacer thickness for a particular wavelength. In some implementations, spacer 120 may be associated with a single cavity configuration. In some implementations, spacer 120 may be associated with a multi-cavity configuration.

In some implementations, multispectral filter 105 may be deposited onto a substrate associated with an optical sensor device. For example, mirror 110-1 may be deposited (e.g., via a deposition process and/or a photolithographic lift-off process) onto a substrate that includes an array of sensor elements to capture information (e.g., spectral data). In some implementations, spacer 120 may permit capture of information relating to multiple wavelengths. For example, a first portion of spacer 120 aligned with a first sensor element may be associated with a first thickness and a second portion of spacer 120 aligned with a second sensor element may be associated with a second thickness. In this case, light, which is directed toward the first sensor element and the second sensor element, may correspond to a first wavelength at the first sensor element based on the first thickness and a second wavelength at the second sensor element based on the second thickness. In this way, multispectral filter 105 permits multispectral sensing by an optical sensor device using a spacer (e.g., spacer 120) associated with multiple portions, which are associated with multiple thicknesses, aligned to multiple sensor elements of the optical sensor device.

In some implementations, multispectral filter 105 may be associated with a set of channels corresponding to a set of component filters. For example, multispectral filter 105 may be associated with a first channel aligned to a first sensor element to direct a first wavelength of light to the first sensor element, and the first channel may be formed by a first component filter. In this case, the first component filter may be a portion of multispectral filter 105. Similarly, multispectral filter 105 may include a second channel aligned to a second sensor element to direct a second wavelength of light to the second sensor element, and the second channel may be formed by a second component filter.

In some implementations, a first channel of multispectral filter 105 may be associated with a different cross-sectional area than a second component filter of multispectral filter 105. For example, based on a responsivity of the sensor element array to the first wavelength and the second wavelength, a responsivity of multispectral filter 105 to the first wavelength and the second wavelength, a flux of the first layer and the second layer, and/or the like, respective cross-sectional areas of the first component filter and the second component filter may be configured to response balance the first sensor element to within a threshold amount of an output of the second sensor element. In some implementations, the first sensor element may be response balanced to within approximately 20% differentiation between channels, within approximately 15% differentiation between channels, within approximately 10% differentiation between channels, within approximately 5% differentiation between channels, within approximately 1% differentiation between channels, within approximately 0.5% differentiation between channels, and/or the like.

In this way, multispectral filter 105 is response balanced to improve a signal to noise ratio for measurements performed using each sensor element associated with multispectral filter 105 relative to another multispectral filter with equal cross-sectional areas for each channel. Moreover, based on using differing cross-sectional areas to perform response balancing, multispectral filter 105 may be associated with reduced cost, reduced complexity, reduced exposure time, and/or the like relative to other techniques for response balancing.

As indicated above, FIG. 1 is provided merely as an example. Other examples are possible and may differ from what was described with regard to FIG. 1.

Figure 2A:
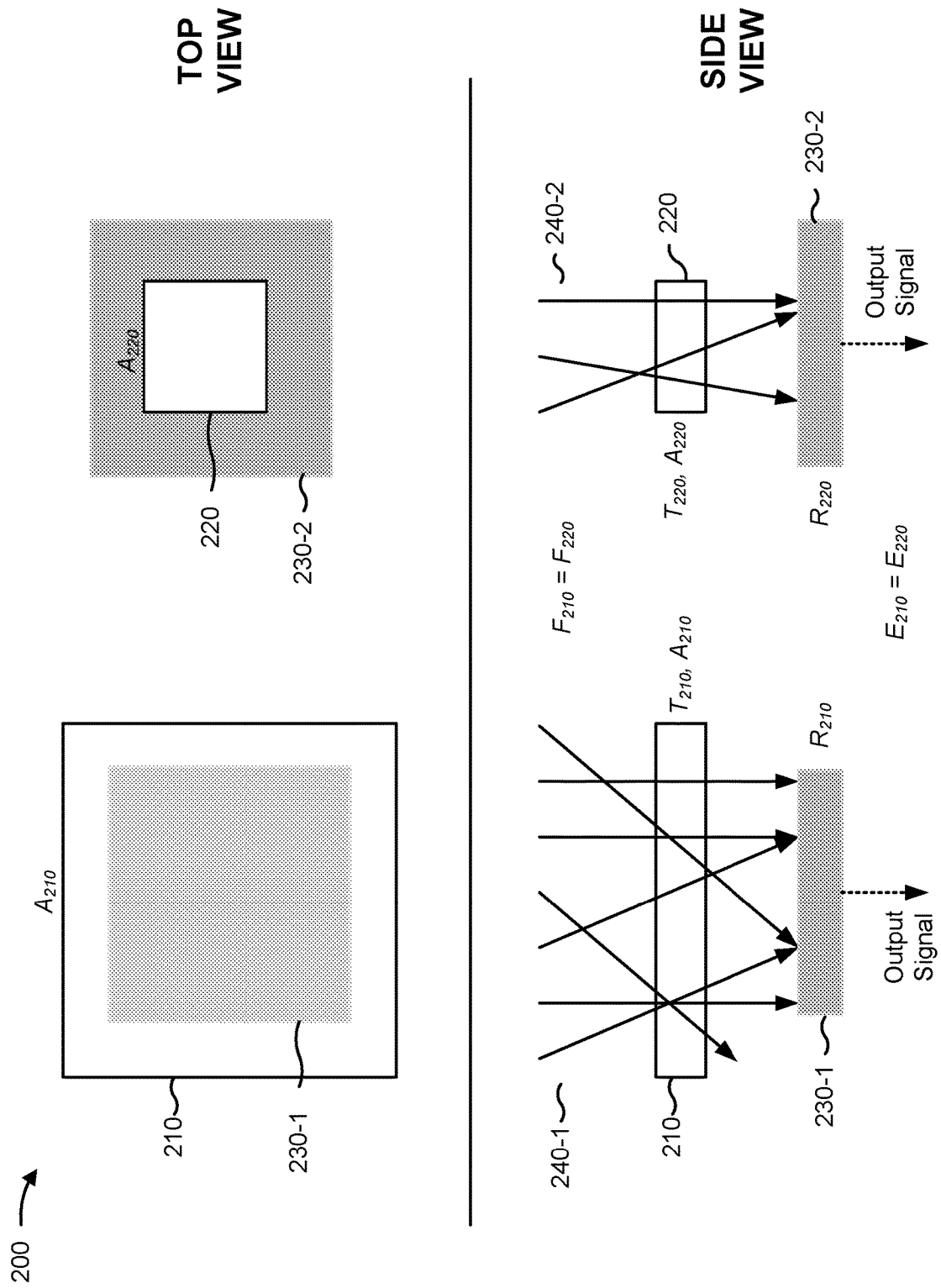
FIGS. 2A and 2B are diagrams of example implementations of response balancing for filter channels of multispectral filters described herein.
Figure 2B:
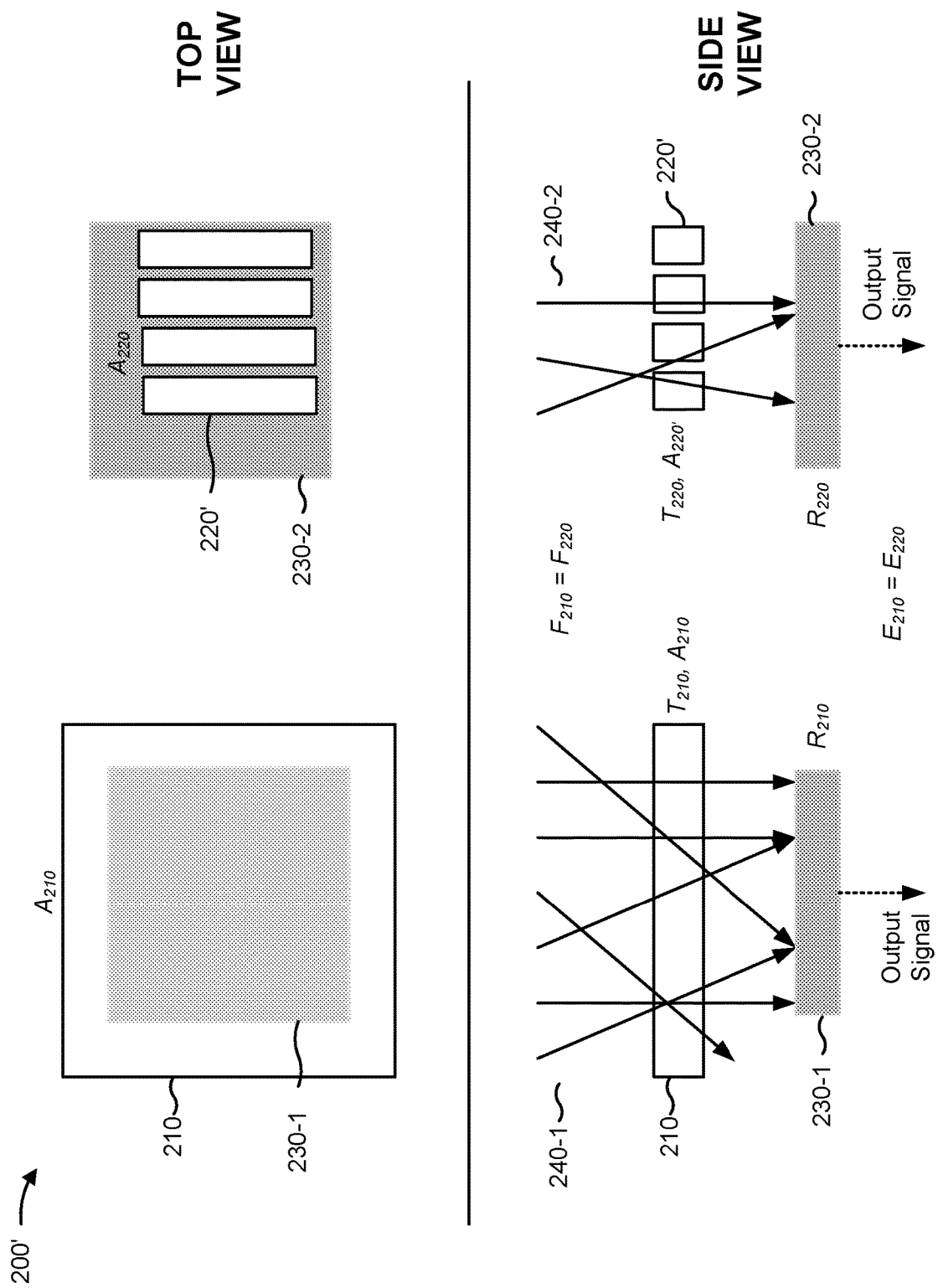

FIGS. 2A and 2B are diagrams of example implementations 200/200' described herein. As shown in FIG. 2A, a multispectral filter may include a first channel for a first wavelength formed by first component filter 210 and a second channel for a second wavelength formed by a second component filter 220.

As further shown in FIG. 2A, each component filter may be aligned to a sensor element of a sensor element array. For example, component filter 210 may be aligned to sensor element 230-1 and component filter 220 may be aligned to sensor element 230-2. In some implementations, a size of the component filters may differ to balance a response associated with sensor elements 230. For example, a size of each component filter may be determined based on a function:

$$F_1 * A_1 * T_1 * R_1 = F_2 * A_2 * T_2 * R_2 \quad (1)$$

where F represents an input flux (from light 240-1 and light 240-2) directed toward a component filter, A represents a cross-sectional area of the component filter, T represents a filter responsivity of the component filter (e.g., a transmissivity) to directing a wavelength toward a sensor element, and R represents a sensor responsivity of the sensor element at the wavelength that is directed by the component filter to the sensor element. In this case, for an input flux of equal power at a first wavelength directed to component filter 210 and at a second wavelength directed to component filter 220 ($F_{210}=F_{220}$), a ratio of areas of component filter 210 to component filter 220 may be determined:

$$\frac{A_{210}}{A_{220}} = \frac{R_{220}T_{220}}{R_{210}T_{210}} \quad (2)$$

In this case, each area may be selected to satisfy (2) and such that an amount of optical power directed to each sensor element does not exceed a maximum power threshold and is not less than a minimum power threshold (e.g., the sensor element is not saturated and is less likely to cause, for example, crosstalk relative to a non-response balanced sensor element). In this way, respective areas of component filter 210 and component filter 220 may be selected to achieve an equal energy balance across respective channels ($E_{210}=E_{220}$, where E is energy of a channel).

Although some implementations, described herein, are described in terms of an input flux of equal power, input fluxes of differing powers at differing wavelengths may be possible, and different channels may be associated with different cross-sectional areas to response balance the input fluxes of differing powers. Moreover, some implementations, described herein are described in terms of response balancing a set of two channels, however additional quantities of channels may be response balanced, such as 32 channels, 64 channels, 128 channels, and/or the like for a multispectral filter.

In some implementations, cross-sectional areas of, for example, component filter 210 and component filter 220 may be configured to achieve a non-equal response. For example, for a desired energy response for sensor elements that is not equal (e.g., to cause a first sensor element to have a greater energy response than a second sensor element), cross-sectional areas may be configured to create the desired energy response. In this way, another type of configurable energy response is possible (e.g., a non-response-balanced energy response) to achieve a particular optical functionality.

As shown in FIG. 2B, rather than a single aperture forming component filter 220, multiple apertures may, collectively, form component filter 220' with an area $A_{220}'$. In this case, the total area $A_{220}'$ may be the same as area $A_{220}$, which may result in example component filter 220' being able to response balance component filter 210 (similar to component filter 220 response balancing component filter 210). In some implementations, each of the apertures forming component filter 220' may be a same area. In some implementations, a first aperture forming component filter 220' may be a first area and a second aperture forming component filter 220' may be a second area.

As indicated above, FIGS. 2A and 2B are provided merely as examples. Other examples are possible and may differ from what was described with regard to FIGS. 2A and 2B.

Figure 3:
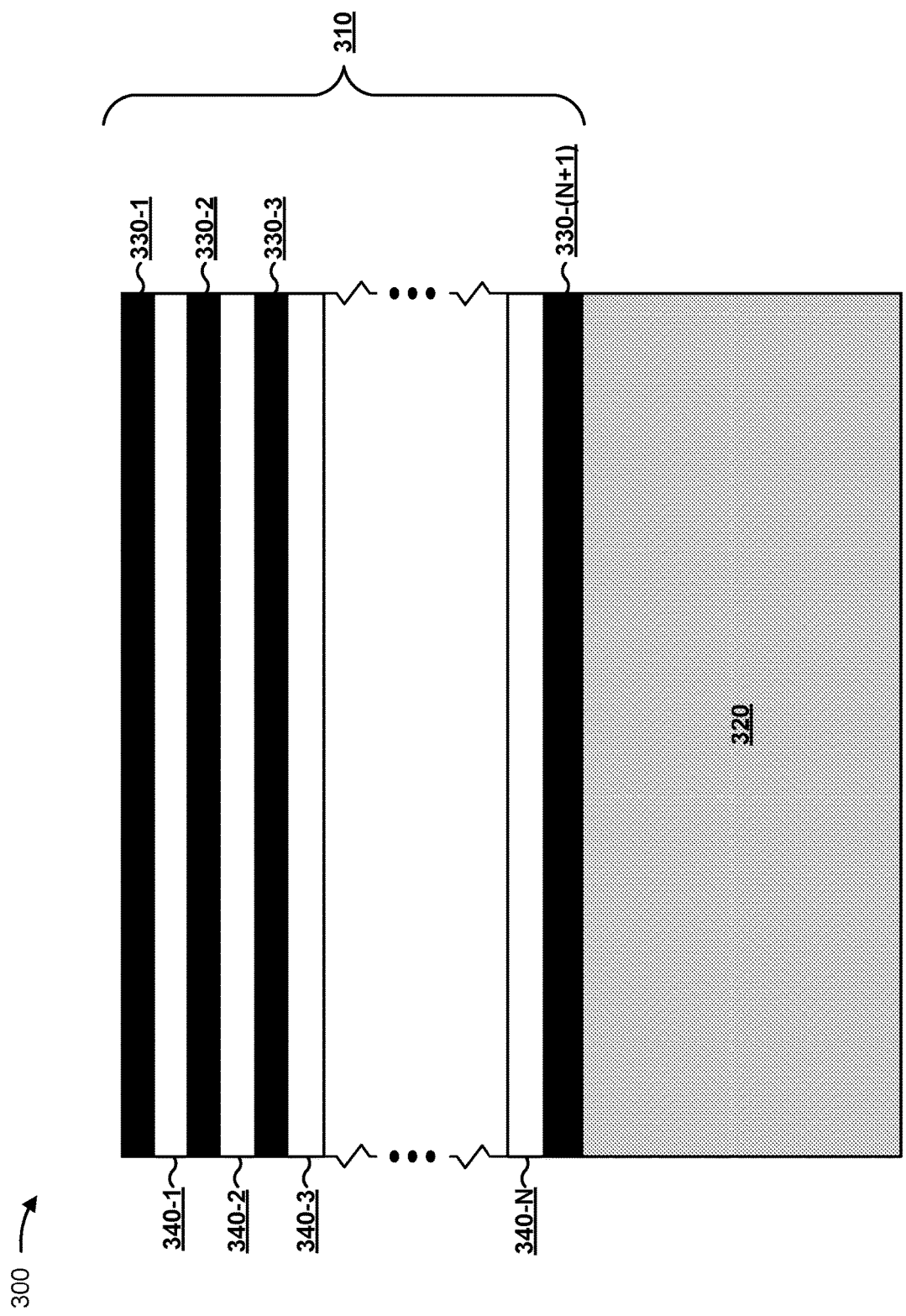
FIG. 3 is a diagram of an example implementation of a multispectral filter described herein.

FIG. 3 is a diagram of an example optical filter 300. FIG. 3 shows an example stackup of an optical filter with multiple channels to direct light described herein. As further shown in FIG. 3, optical filter 300 includes an optical filter coating portion 310 and a substrate 320.

Optical filter coating portion 310 includes a set of optical filter layers. For example, optical filter coating portion 310 includes a first set of layers 330-1 through 330-N+1 (N≥1) and a second set of layers 340-1 through 340-N. In another example, optical filter coating portion 310 may be a single type of layer (e.g., one or more layers 330), three or more types of layers (e.g., one or more layers 330, one or more layers 340, and one or more of one or more other types of layers), and/or the like. In some implementations, layers 330 may include a set of layers of a high refractive index material (H layers), such as silicon layers, hydrogenated silicon layers, silicon-germanium (SiGe) layers, hydrogenated germanium layers, hydrogenated silicon-germanium layers, and/or the like. Although some layers may be described as a particular material, such as SiGe, some layers may include (small quantities of) phosphor, boron, nitride, and/or the like. In some implementations, layers 340 may include a set of layers of a low refractive index material (L layers), such as silicon dioxide layers and/or the like.

Additionally, or alternatively, the L layers may include silicon nitride layers, tantalum pentoxide ($Ta_2O_5$) layers, niobium pentoxide ($Nb_2O_5$) layers, titanium dioxide ($TiO_2$) layers, aluminum oxide ($Al_2O_3$) layers, zirconium oxide ($ZrO_2$) layers, yttrium oxide ($Y_2O_3$) layers, silicon nitride ($Si_3N_4$) layers, a combination thereof, and/or the like.

In some implementations, optical filter coating portion 310 may be associated with a particular quantity of layers, m. For example, a hydrogenated silicon-germanium based optical filter may include a quantity of alternating high refractive index layers and low refractive index layers, such as a range of 2 layers to 200 layers. In some implementations, optical filter coating portion 310 may be fabricated using a sputtering procedure. For example, optical filter coating portion 310 may be fabricated using a pulsed-magnetron based sputtering procedure to sputter alternating layers 330 and 340 on a glass substrate or another type of substrate, as described herein. In some implementations, multiple cathodes may be used for the sputtering procedure, such as a first cathode to sputter silicon and a second cathode to sputter germanium, thereby forming a silicon-germanium layer.

In some implementations, optical filter coating portion 310 may be annealed using one or more annealing procedures, such as a first annealing procedure at a temperature of approximately 280 degrees Celsius or between approximately 200 degrees Celsius and approximately 400 degrees Celsius, a second annealing procedure at a temperature of approximately 320 degrees Celsius or between approximately 250 degrees Celsius and approximately 350 degrees Celsius, and/or the like.

In some implementations, each layer of optical filter coating portion 310 may be associated with a particular thickness. For example, layers 330 and 340 may each be associated with a thickness of between 1 nm and 1500 nm, between 10 nm and 500 nm, and/or the like. Additionally, or alternatively, optical filter coating portion 310 may be associated with a thickness of between 0.1 μm and 100 μm, 0.25 μm and 100 μm, and/or the like. In some implementations, at least one of layers 330 and 340 may each be associated with a thickness of less than 1000 nm, less than 100 nm, or less than 5 nm, and/or the like. Additionally, or alternatively, optical filter coating portion 310 may be associated with a thickness of less than 100 μm, less than 50 μm, less than 10 μm, and/or the like. In some implementations, a layer may be associated with multiple different thicknesses. For example, to form a set of channels, a thickness of a particular layer (e.g., a spacer layer disposed between a set of reflectors) may be varied to cause different wavelengths of light to be directed to different sensor elements via different channels.

In some implementations, optical filter 300 may be associated with a particular spectral range, such as a near-infrared spectral range, a mid-infrared spectral range, and/or the like. For example, optical filter 300 may be associated with a spectral range from approximately 600 nm to approximately 2500 nm, from approximately 700 nm to approximately 2000 nm, from approximately 900 nm to approximately 1500 nm, and/or the like.

In some implementations, a cross-sectional area of each channel may vary. For example, a first channel formed by a first component filter (e.g., a first area of optical filter 300 with a first thickness) may be associated with a first cross-sectional area and a second channel formed by a second component filter (e.g., a second area of optical filter 300 with a second thickness) may be associated with a second cross-sectional area. In this way, differing cross-sectional areas of different channels may be used to balance responses of sensor elements for the different channels. In some implementations, cross-sectional areas of component filters of optical filter 300 may vary by a threshold amount. For example, a first component filter may be associated with a cross-sectional area that is greater than a cross-sectional area of a second component filter by approximately 1%, approximately 5%, approximately 10%, approximately 20%, approximately 50%, approximately 100%, approximately 200%, and/or the like.

In some implementations, multiple channels may be associated with a common wavelength. For example, a first channel may be associated with a same thickness as a second channel and a different thickness than a third channel. In this case, the first channel and the second channel may be associated with a first wavelength and the third channel may be associated with a third wavelength. Collectively, a net area of the first channel and the second channel may be configured based on an area of the third channel to balance a response between sensor elements associated with the first channel, second channel, and third channel. In this way, multiple component filters forming multiple channels may be associated with a net cross-sectional area that is balanced with another channel to balance responses of sensor elements for the different channels.

Although some implementations, described herein, are described in terms of a binary multispectral filter, another type of multispectral filter with differing cross-sectional areas for component filters may be used, such as a single-layer polymer multispectral filter, a multi-layer polymer multispectral filter, an organic dye multispectral filter, and/or the like.

As indicated above, FIG. 3 is provided merely as an example. Other examples are possible and may differ from what was described with regard to FIG. 3.

Figure 4:
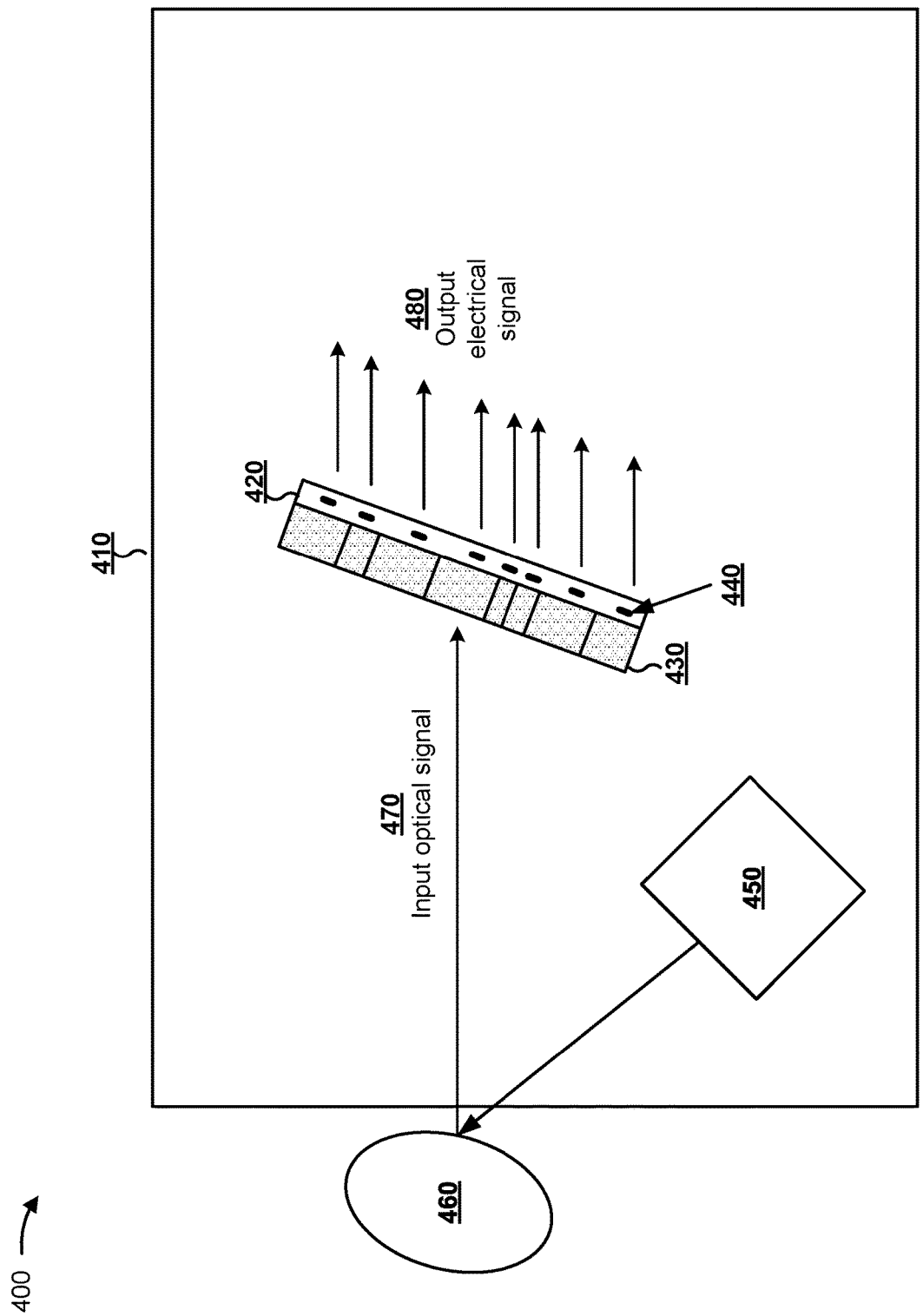
FIG. 4 is a diagram of an example implementation of an optical system that includes a multispectral filter described herein.

FIG. 4 is a diagram of an example implementation 400 described herein. As shown in FIG. 4, example implementation 400 includes a sensor system 410. Sensor system 410 may be a portion of an optical system, and may provide an electrical output corresponding to a sensor determination. For example, sensor system 410 may be a portion of a biometric system, a security system, a health monitoring system, an object identification system, a spectroscopic identification system, and/or the like. Sensor system 410 includes an optical filter structure 420, which includes an optical filter 430, and a set of optical sensors 440 (e.g., a sensor element array). For example, optical filter structure 420 may include an optical filter 430 that performs a blocking functionality and/or the like. Sensor system 410 includes an optical transmitter 450 that transmits an optical signal toward a target 460 (e.g., a person, an object, etc.).

Although implementations, described herein, may be described in terms of an optical filter in a sensor system, implementations described herein may be used in another type of system, may be used external to the sensor system, and/or the like.

In some implementations, another arrangement of optical filter 430 and optical sensor 440 may be utilized. For example, rather than passing the second portion of the optical signal collinearly with the input optical signal, optical filter 430 may direct the second portion of the optical signal in another direction toward a differently located optical sensor 440. In some implementations, optical sensor 440 may be an avalanche photodiode, an Indium-Gallium-Arsenide (InGaAs) detector, an infrared detector, and/or the like.

As further shown in FIG. 4, and by reference number 470, an input optical signal is directed toward optical filter structure 420. The input optical signal may include near-infrared light, mid-infrared light, and/or the like emitted by optical transmitter 450 and ambient light from the environment in which sensor system 410 is being utilized. For example, when optical filter 430 is a bandpass filter, optical transmitter 450 may direct near-infrared light toward an object for a spectroscopic measurement, and the near-infrared light may be reflected off target 460 (e.g., the object) toward optical sensors 440 to permit optical sensors 440 to perform a measurement of the near-infrared light. In this case, ambient light may be directed toward optical sensor 440 from one or more ambient light sources (e.g., a light bulb or the sun).

In another example, multiple light beams may be directed toward target 460 and a subset of the multiple light beams may be reflected toward optical filter structure 420, which may be disposed at a tilt angle relative to optical sensor 440, as shown. In some implementations, another tilt angle may be used. In some implementations, optical filter structure 420 may be disposed and/or formed directly onto optical sensors 440, disposed a distance from optical sensors 440 (e.g., via free-space optics), and/or the like. For example, optical filter structure 420 may be coated and patterned onto optical sensors 440 using, for example, photolithography, a sputter deposition technique (e.g., using argon gas and helium gas as an inert gas mixture for sputter deposition), and/or the like.

In another example, optical transmitter 450 may direct near-infrared light toward another type of target 460, such as for detecting a gesture in a gesture recognition system, detecting objects in proximity to a vehicle, detecting objects in proximity to a blind person, detecting a proximity to an object (e.g., using a LIDAR technique), and/or the like, and the near-infrared light and ambient light may be directed toward optical sensor 440 as a result.

In some implementations, a portion of the optical signal is passed by optical filter 430 and optical filter structure 420. For example, alternating high index material layers and low index material layers of optical filter 430 may cause a first portion of light to be reflected and a second portion of light to be passed. In this case, optical filter 430 may include multiple channels formed using multiple component filters, and each channel may pass a different wavelength of light. Additionally, or alternatively, two or more channels may pass a common wavelength of light.

As further shown in FIG. 4, and by reference number 480, based on the portion of the optical signal being passed to optical sensor 440, optical sensor 440 may provide an output electrical signal for sensor system 410, such as for use in performing a spectroscopic measurement, recognizing a gesture of the user, detecting the presence of an object, and/or the like. Based on configuring a cross-sectional area of component filters corresponding to each channel, a response of optical sensors 440 is balanced, thereby improving measurement accuracy relative to an overexposed or underexposed sensor element in a sensor element array.

As indicated above, FIG. 4 is provided merely as an example. Other examples are possible and may differ from what was described with regard to FIG. 4.

Figure 5A:
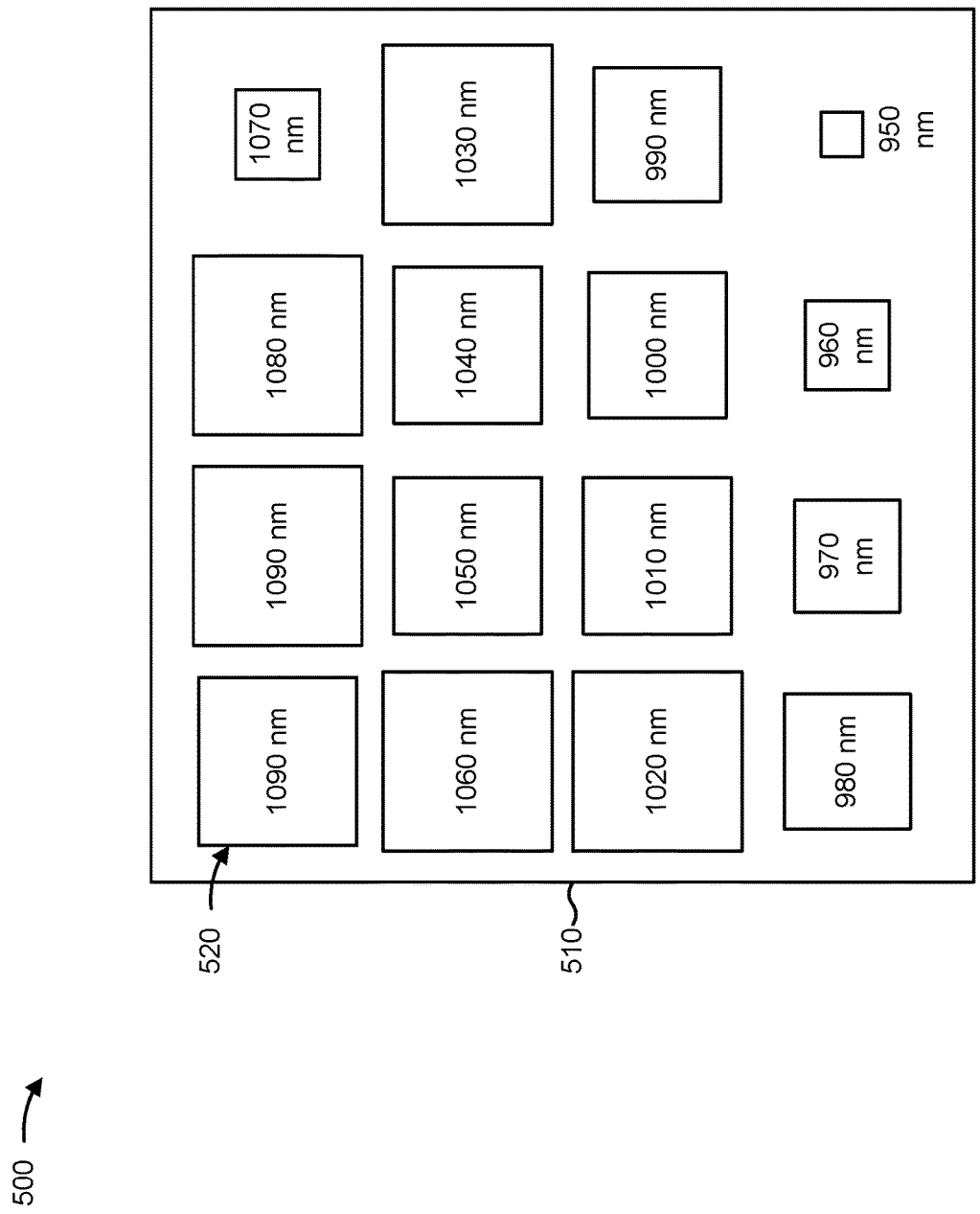
FIGS. 5A and 5B are diagrams of an example implementations of multispectral filters described herein.
Figure 5B:
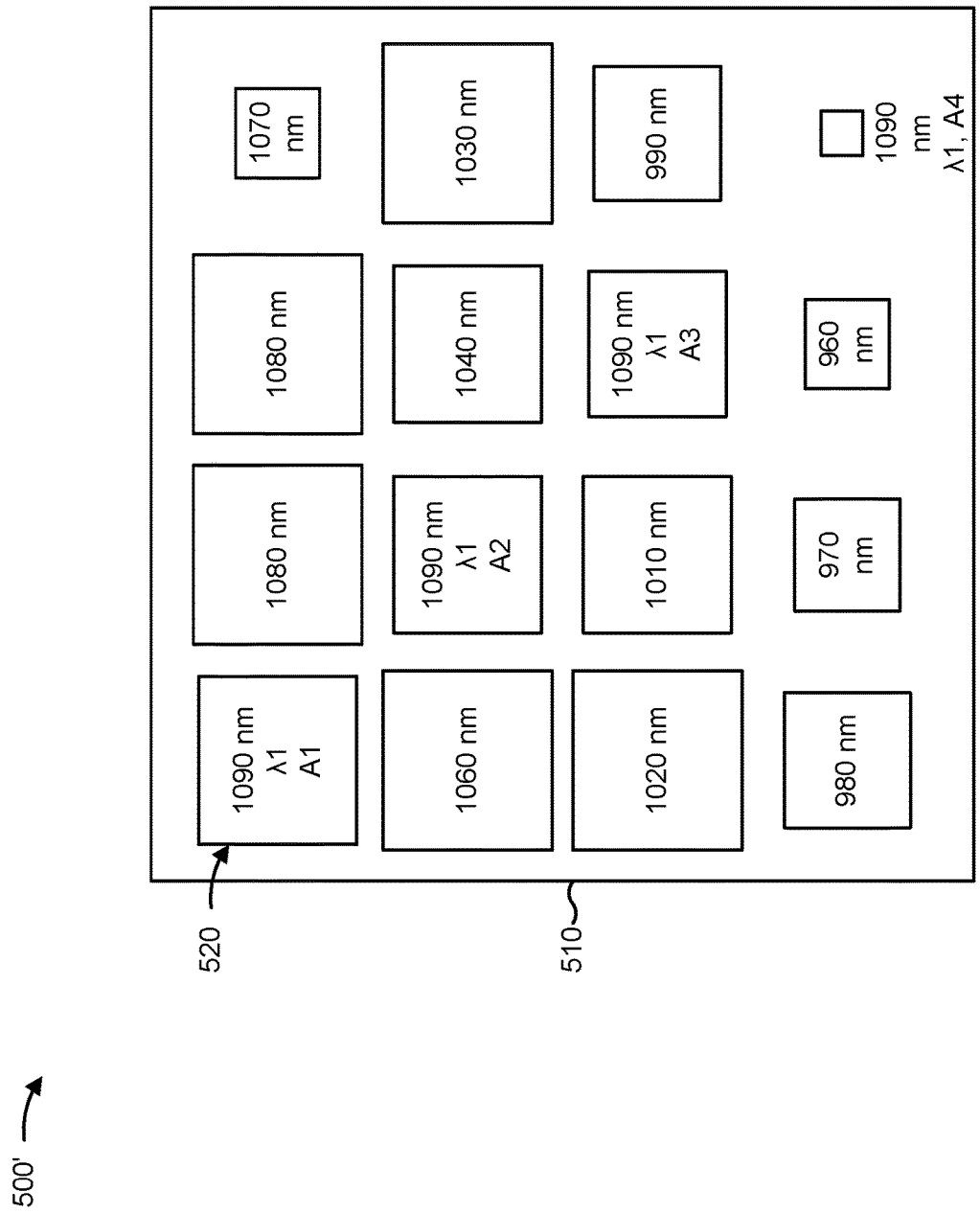

FIGS. 5A and 5B are diagrams of example implementations 500/500' described herein. As shown in FIG. 5A, example implementation 500 may include an optical filter 510 with multiple component filters 520 forming multiple channels.

As further shown in FIG. 5A, each component filter 520 may be associated with a particular wavelength of light that is directed to a respective sensor element aligned to each component filter 520. For example, a first component filter 520 may be associated with passing light with a wavelength of 950 nanometers (nm), a second component filter 520 may be associated with passing light with a wavelength of 960 nm, and/or the like. As shown, component filters 520 may be associated with different sizes corresponding to different filter responsivities, different sensor element responsivities, and/or the like for different wavelengths to response balance the different sensor elements. As shown, some wavelengths may be directed to one or more sensor elements by multiple component filters 520. For example, a set of two component filters 520 may be associated with passing light associated with a wavelength of 1090 nm to response balance the difference sensor elements.

As shown in FIG. 5B, multiple component filters 520 may be associated with a common wavelength, $\lambda 1$ (e.g., 1090 nm). In this case, each of the component filters 520 associated with the common wavelength may be associated with different areas (e.g., A1, A2, A3, and A4, respectively). Based on including multiple component filters 520 with different areas to receive light associated with a common wavelength, example implementation 500' enables multiple samplings of a signal level of the light associated with the common wavelength, thereby enabling high-dynamic range (HDR) imaging.

As indicated above, FIGS. 5A and 5B are provided merely as examples. Other examples are possible and may differ from what was described with regard to FIGS. 5A and 5B.

In this way, a multispectral filter may include varying cross-sectional areas for component filters and corresponding channels to response balance sensor elements associated with the component filters and corresponding channels. In this way, multispectral filter may improve an accuracy of sensing by the sensor elements, reduce an exposure time to perform a measurement, reduce cost, reduce size, and/or the like relative to other sensing techniques and/or response balancing techniques described above.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A system, comprising:
a set of optical sensors disposed in a substrate; and
a multispectral filter deposited on the substrate,
the multispectral filter including:
at least one layer configured to form a plurality of channels corresponding to the set of optical sensors,
wherein a plurality of cross-sectional areas of the plurality of channels is configured to response balance the set of optical sensors.

2. The system of claim 1, wherein a first input flux at a first wavelength for a first channel of the plurality of channels is different from a second input flux at a second wavelength for a second channel of the plurality of channels.

3. The system of claim 1, wherein the system is at least one of:
a biometric system,
a security system,
a health monitoring system,
an object identification system, or
a spectroscopic identification system.

4. The system of claim 1, wherein the plurality of channels include:
a first channel aligned to a first optical sensor of the set of optical sensors, and
a second channel aligned to a second optical sensor of the set of optical sensors.

5. The system of claim 4,
wherein the first channel directs a first wavelength of light to the first optical sensor, and
wherein the second channel directs a second wavelength of light to the second optical sensor.

6. The system of claim 4,
wherein the first channel is formed by a first component filter of the multispectral filter, and
wherein the second channel is formed by a second component filter of the multispectral filter.

7. The system of claim 1,
wherein the plurality of channels include:
a first channel that is associated with a first cross-sectional area of the plurality of cross-sectional areas, and
a second channel that is associated with a second cross-sectional area of the plurality of cross-sectional areas, and
wherein the second cross-sectional area is different from the first cross-sectional area.

8. The system of claim 1,
wherein the set of optical sensors include a first optical sensor and a second optical sensor,
wherein the multispectral filter includes a first component filter and a second component filter, and
wherein the first component filter and the second component filter are configured to response balance the first optical sensor to be within a threshold amount of an output of the second optical sensor.

9. The system of claim 1, wherein the set of optical sensors include an optical sensor that is response balanced to within approximately 1% or less differentiation between channels of the plurality of channels.

10. The system of claim 1, wherein the multispectral filter includes a component filter that is formed from a single aperture.

11. The system of claim 1, wherein the multispectral filter includes a component filter that is formed from multiple apertures.

12. The system of claim 11,
wherein the multiple apertures include a first aperture and a second aperture, and
wherein a first area of the first aperture is same as a second area of the second aperture.

13. An optical filter comprising:
a multispectral filter including:
a first component filter associated with a first cross-sectional area, and
a second component filter associated with a second cross-sectional area,
wherein the first cross-sectional area and the second cross-sectional area balance responses of a first sensor element and a second sensor element of a set of sensor elements.

14. The optical filter of claim 13, wherein the second cross-sectional area is different from the first cross-sectional area.

15. The optical filter of claim 13,
wherein the first component filter forms a first channel, and
wherein the second component filter forms a second channel.

16. The optical filter of claim 15, wherein the first channel and the second channel are associated with a common wavelength.

17. The optical filter of claim 15,
wherein the multispectral filter further includes a third component filter that forms a third channel,
wherein the first channel and the second channel are associated with a first thickness and a first wavelength,
wherein the third channel is associated with a second thickness that is different from the first thickness, and
wherein the third channel is associated with a second wavelength that is different from the first wavelength.

18. The optical filter of claim 15,
wherein the multispectral filter further includes a third component filter that forms a third channel, and
wherein a net area of the first channel and the second channel is configured based on an area of the third channel to balance a response between the first sensor element, the second sensor element, and a third sensor element of the set of sensor elements.

19. A system comprising:
a set of sensor elements; and
a filter including:
a first component filter that forms a first channel and is aligned to a sensor element of the set of sensor elements, and
a second component filter that forms a second channel, and
a third component filter that forms a third channel,
wherein a net area of the first channel and the second channel is configured based on area of the third channel to balance a response between one or more of the sensor elements.

20. The system of claim 19, wherein the net area is a net cross-sectional area.

\* \* \* \* \*